United States Patent
Albrecht et al.

[19]

[11] Patent Number: 5,875,171
[45] Date of Patent: Feb. 23, 1999

[54] INTERLOCKING DISK STACK THAT PREVENTS DISK SLIP IN A STORAGE DISK

[75] Inventors: David W. Albrecht; James William Berberich, both of San Jose, Calif.; Suryanarayan G. Hegde, Hollowville, N.Y.; Thomas Franklin Roth, Morgan Hill, Calif.

[73] Assignee: International Business Machines Corporation, Armonk, N.Y.

[21] Appl. No.: 704,836

[22] Filed: Aug. 28, 1996

[51] Int. Cl.[6] .............................. G11B 17/02; G11B 5/84; G11B 7/26
[52] U.S. Cl. .................... 369/281; 360/98.08; 360/99.12
[58] Field of Search .............................. 360/98.08, 99.05, 360/99.12; 369/280, 282, 289, 290, 258

[56] References Cited

U.S. PATENT DOCUMENTS

| | | | |
|---|---|---|---|
| 4,754,351 | 6/1988 | Wright | 360/97 |
| 4,764,828 | 8/1988 | Gollibach | 360/98 |
| 4,875,118 | 10/1989 | Kaymaram | 360/99.12 |
| 4,945,432 | 7/1990 | Matsudaira et al | 360/98.02 |
| 5,031,062 | 7/1991 | Wood et al. | 360/98.08 |
| 5,267,106 | 11/1993 | Brue et al. | 360/98.08 |
| 5,596,462 | 1/1997 | Smith | 360/99.12 |

FOREIGN PATENT DOCUMENTS

| | | |
|---|---|---|
| 62-239439 | 10/1989 | Japan . |
| 3-162785(A) | 7/1991 | Japan . |
| 3-272069(A) | 12/1991 | Japan . |
| 4-325979(A) | 11/1992 | Japan . |
| 6-131782(A) | 5/1994 | Japan . |
| 2 158633 | 11/1985 | United Kingdom . |

OTHER PUBLICATIONS

IBM Technical Disclosure Bulletin vol. 21, No. 2, "Disk Pack Compliance Clamp", F. A. Besha and T. J. Rajac, pp. 802–803, Jul. 1978.

IBM Technical Disclosure Bulletin vol. 33, No. 5, "Clamping Technique of Glass–Substrate Disk", pp. 49–50, Oct. 1990.

*Primary Examiner*—William R. Korzuch
*Attorney, Agent, or Firm*—Noreen A. Krall; Brian F. Russell; Andrew J. Dillon

[57] ABSTRACT

An interlocking disk apparatus for preventing disk slip in a disk stack of a magnetic or optical disk drive is provided. A textured region within the inner diameter of the disks in the disk stack is forced in tight contact with a conformable adjacent surface, such as a spacer ring, clamp plate, and/or hub flange. The textures on the disks penetrate into and/or through the conformal coatings on the adjacent surfaces, resulting in mechanical interlock that inhibits in-plane displacements of the disks from shock and generally improving interfacial contact of the surfaces within the disk stack, thus requiring lower clamping pressures to the disk stack and resulting in greater disk flatness and minimizing disk distortion. Electrostatic Discharge within the disk stack is prevented by diffusing conductive materials into the polymer conformal coating to increase its electrical conductivity.

16 Claims, 7 Drawing Sheets

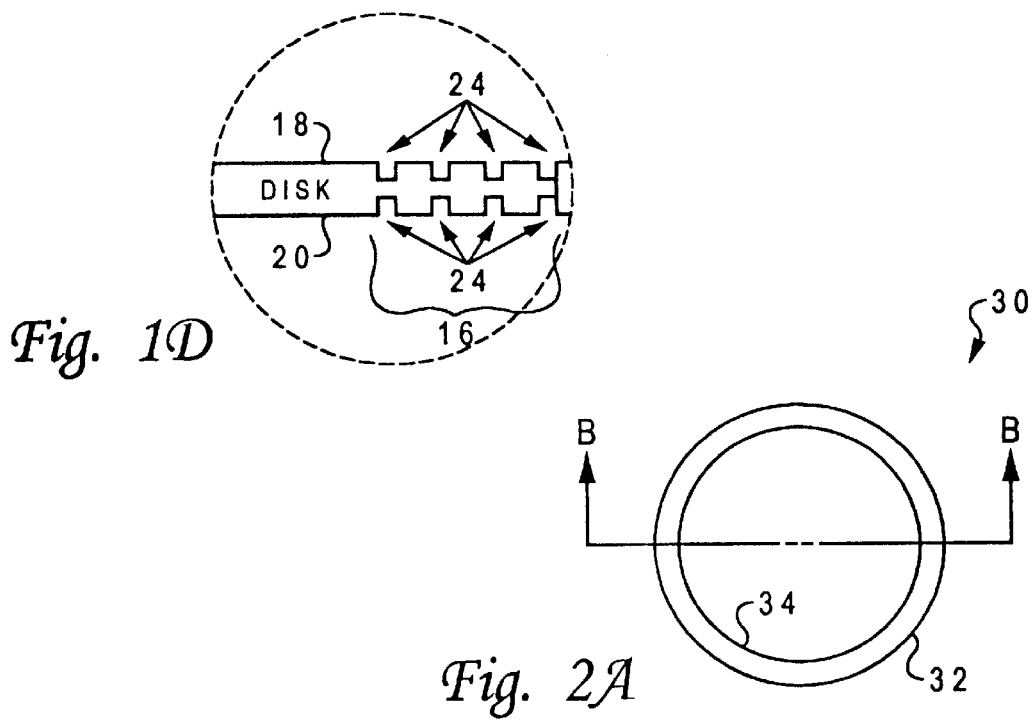
*Fig. 1D*
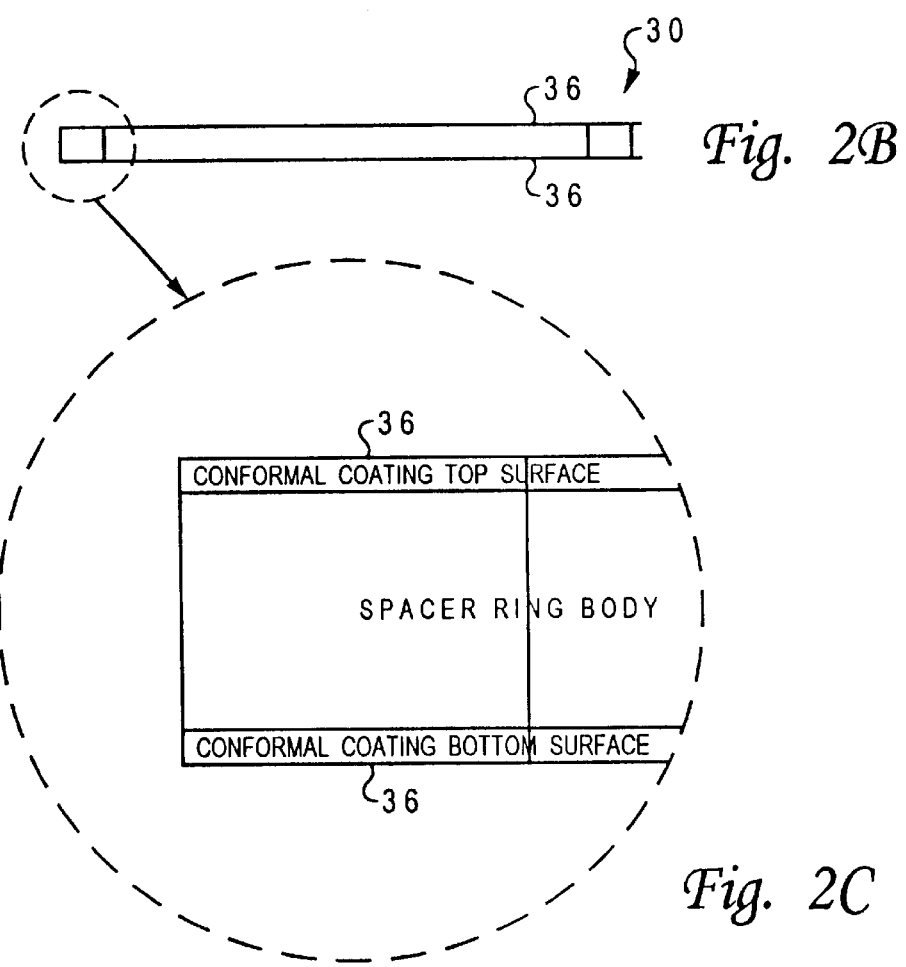
*Fig. 2A*
*Fig. 2B*
*Fig. 2C*

INTERLOCKING DISK STACK THAT PREVENTS DISK SLIP IN A STORAGE DISK

BACKGROUND OF THE INVENTION

1. Technical Field

The present invention relates in general to an improved information storage and retrieval disk drive, and in particular to an improved disk stack in a disk drive having reduced disk slippage.

2. Description of the Related Art

Magnetic and optical disk drives are becoming smaller, higher in capacity, and used in more portable applications where they may be subjected to mechanical shock or force. Such shocks can lead to movement or slippage of the magnetic or optical disk that hold information relative to the hub on which they are mounted, resulting in mis-location of pre-written tracks and servo information and further causing mis-located tracks being written to the disk. This in turn can cause failures or degradation of the performance of the disk drive, since the disk's tracks may not be able to be reliably located, followed, and read by the actuator servo system of the disk drive. As disk drives increase in track density and spindle rotation speed, smaller displacements of individual disks or the entire disk stack due to shock induced disk slip will be tolerable before such reliability problems occur.

Disk slip has previously been controlled through application of large normal forces applied to a center region on the surfaces of the disks by a clamp mechanism that holds the disks tightly in position relative to the spindle/hubs and other disks within the disk stack (in large capacity disk drive systems, information is stored on multiple disks configured in what is called a disk stack). Also, disk spacer rings placed between the disks within the disk stack have been fabricated using materials such as ceramics to increase the coefficient of friction between the disks and the spacer rings, thereby resisting disk slippage. An alternative approach that has been used is to adhesively bond a disk to a spindle hub or a spacer, thereby preventing disk slip.

Unfortunately, these prior methods have several disadvantages. The excessive clap loads required to prevent disk slip, as used in the clamping method, often causes distortion of the disks and stripping of clamp screws. The adhesive method creates multiple problems including problems of dispensing the adhesive during manufacture or assembly of the disk drive, and making the disk stack assembly extremely difficult to disassemble for rework and repair. What is needed is a device for preventing disk slip in disk drives that does not apply excessive forces upon the surface of the disks that may cause distortion, that is easily engaged with the disk stack during manufacture or assembly of the disk drive (i.e. does not require the application of a messy adhesive or the addition of a clamping device during assembly), and that can be easily disengaged to allow disassembly of the disk stack during rework or repair.

SUMMARY OF THE INVENTION

An interlocking disk apparatus that prevents disk displacement is provided, comprising at least one disk having a top surface and a bottom surface, wherein at least one surface has a textured region having a non-information-bearing texture; and a conformable adjacent surface forced in tight contact with the textured region of the at least one disk, wherein the conformable adjacent surface conforms to the texture to form an interlock between the surfaces when they are forced together such that, when the disk is subjected to an external force, the disk is inhibited from moving in the direction of the force by the interlocked surfaces. The above as well as additional objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

FIGS. 1A–1D depict an interlocking disk, in accordance with a preferred embodiment of the present invention;

FIGS. 2A–2C depict a spacer ring having a conformal coating on its surface, in accordance with the preferred embodiment of the present invention;

DETAILED DESCRIPTION OF THE PREFERRED EMBODIMENT

Figure 1A:
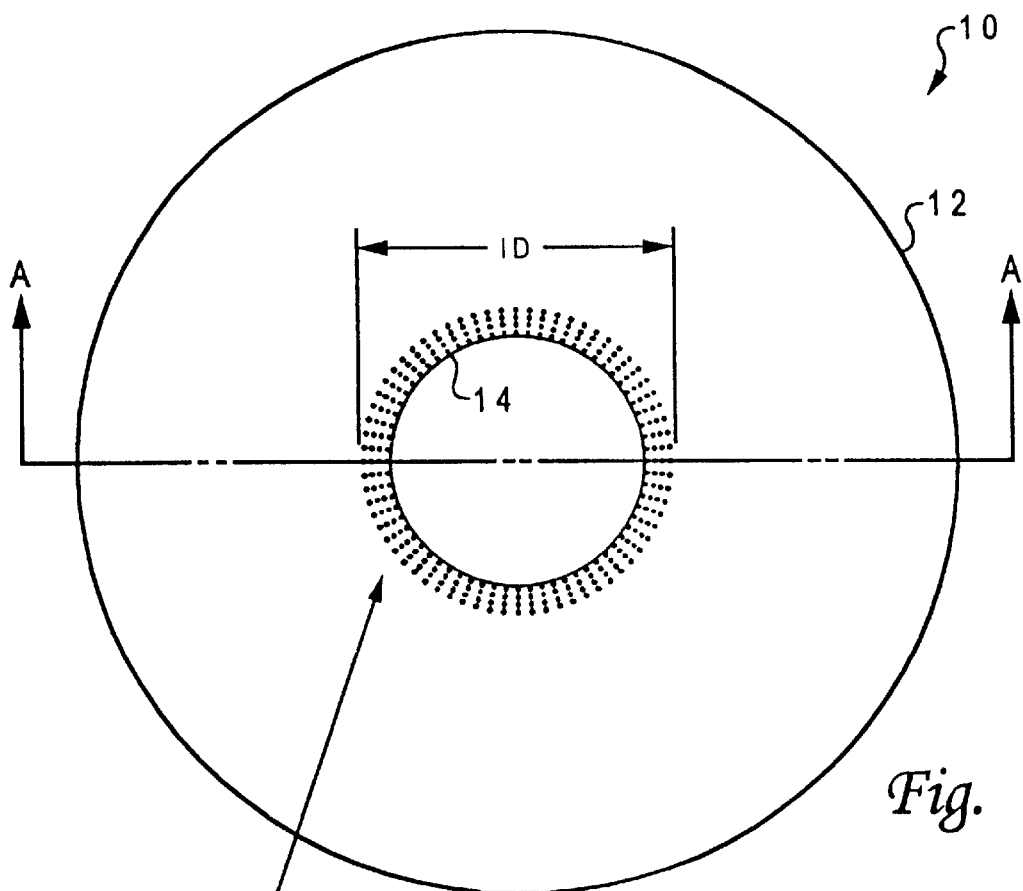

The present invention is an interlocking disk apparatus that provides mechanical interlocking of disks with adjacent components in a disk stack of a magnetic or optical disk drive to prevent disk slip that may be caused by mechanical shock to the disk drive. This mechanical interlocking is accomplished by provided appropriate texture in the clamped inner regions of the magnetic hard disk or optical disk surfaces, and by providing a conformal coating on adjacent surfaces within the disk stack such as spacer rings, disk clamps, and/or hub flanges. Then, when the disks and spacers are stacked and clamped together by the disk clamp and/or hub flanges, the textures on the disks penetrate into and/or through the conformal coatings on the adjacent surfaces, resulting in mechanical interlock and generally improving interfacial contact of the surfaces within the disk stack. The substantial interlock of the present invention prevents in-plane displacements of the disks due to forces from mechanical shocks or other events, thus requiring lower clamping pressures to the disk stack and resulting in greater disk flatness and lower distortion of the disks.

With reference now to the figures, and in particular with reference to FIGS. 1A–1D, there is depicted an interlocking disk, in accordance with a preferred embodiment of the present invention. As seen in top view of FIG. 1A, disk 10 is a small, thin, circular disk having an outer circumference along edge 12 and an inner circumference along edge 14 (creating a hole in disk 10). As will be appreciated by those skilled in the art, disk 10 may be a magnetic disk, an optical disk, a magneto-optical disk, or any other type of information-bearing disk used in an information storage and/or retrieval system. A textured region 16 is formed on an inner-ring portion of both the top surface and bottom surface of disk 10. Textured region 16 contains features on the surface of the disk that generally protrude from the disk surface and/or inset from the surface. The textured region is bounded by the inner circumference 14 and the "Inner Diameter" (ID) of the disk, as will be understood by those skilled in the art. As will also be understood, this region within the ID is often called the clamping region and is used for the placement of spacer rings, hub flanges, or disk clamps when the disk is used in a disk drive. Therefore, the textured region does not contain encoded information that can be read by a transducer or other device.

Figure 1B:
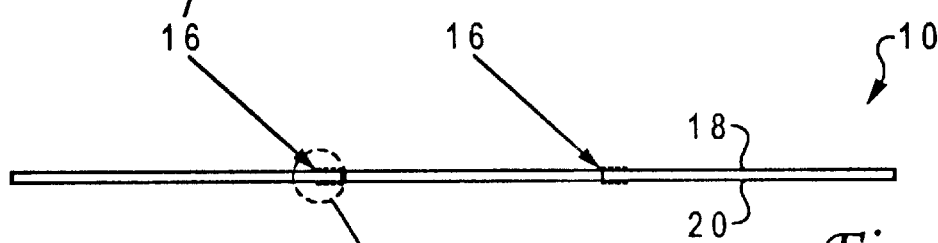
Figure 1C:
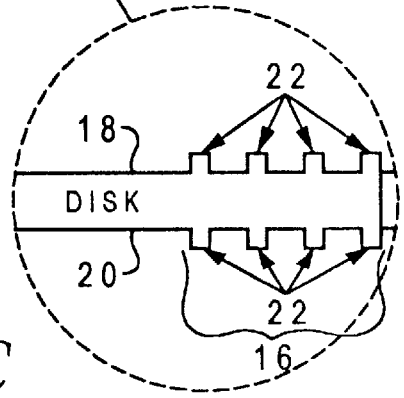

A sectional side view through cut A—A of disk 10 can be seen in FIG. 1B. The textured region 16 is shown having protruding portions that extend from both the textured region of top surface 18 and the textured region of bottom surface 20. An enlarged sectional side view showing the textured regions 16 of top surface 18 and bottom surface 20 is shown is FIG. 1C. Protruding portions 22 extend from the disk surfaces. This texturing of the disk surface in the clamped region does not necessarily have to be designed as shown in FIG. 1C, but instead can be optimized in terms of the height, size, shape, location, and quantity of protruding and/or inset features required for a given system configuration. These textural features can be imparted through a laser heating process, deposition of additional material through a mask, etching, or other processes or combination of processes, as will be appreciated by those skilled in the art. The enlarged sectional side view shown in FIG. 1D shows an alternate preferred embodiment, where textured regions 16 contain inset portions 24 for creating the texture.

In accordance with the present invention, a conformable adjacent surface is placed on a spacer ring, disk clamp, and/or hub flange that makes contact with one or both surfaces of disk 10. When the disk is assembled in a disk stack, these adjacent surfaces are forced against the texture in the textured region 16 (i.e., the clamping region) and conform to the texture to form an interlock between the disk 10 at textured region 16 and the conformable adjacent surface. As will be appreciated by those skilled in the art, such an interlocked disk is inhibited by the interlocked surfaces from moving in the direction of a force or shock applied to the disk.

With references now to FIGS. 2A–2C, there is depicted a spacer ring having a conformal coating on its surfaces, in accordance with the preferred embodiment of the present invention. As seen in the top view of FIG. 2A, spacer ring 30 has an outer circumference 32 and an inner circumference 34. A sectional side view of the spacer ring 30 through cut B—B is shown in FIG. 2B. Conformal coatings 36 are formed on the top surface and bottom surface of the spacer ring 30.

The enlarged sectional side view in FIG. 2C shows the thin, conformal coatings 36 on the surfaces of spacer ring 30. The conformal coating 36 is a uniform and continuous layer formed on the surface of the ring that is able to maintain compressibility in order to allow penetration by the texture 16 formed on disk 10. The conformal coating thickness should be as thin as possible to minimize disk stack assembly tolerances, and generally should be slightly less than the height of the texture and less than the spacing (pitch) of the written magnetic tracks on the disk.

Application of the conformal coating to the surfaces of spacer ring 30 (or a disk clamp or a Hub flange) can be accomplished via vacuum deposition, vapor deposition, dipping, spraying, spin-coating, or other methods in the art. The conformal coating 36 can be optimized in terms of location, thickness, adhesion, and mechanical properties to provide the greatest interlocking with the disk texture and resultant resistance to in-plane displacement of the disk. Chemical properties of the conformal coating may also be tailored to provide an adhesive bond to supplement the mechanical interlock in resisting disk slip. Parylene, polyaniline and other polymer coatings are possible coatings for conformal coating materials.

According to another feature of the present invention, the conformal coating 36 is composed to have sufficient electrical conductivity to provide a low impedance ground path through the disk stack to prevent electrostatic discharge (ESD) damage to magnetic read/write heads in the disk drive system. Because the spacer rings are often formed from non-conductive ceramic materials such as a xylelene polymer (for example, parylene C, D, or N), conductivity of the spacer ring can be created by depositing a thin metallization layer using vapor deposition on the base parylene material. This metallized parylene is then post-annealing to diffuse the metallization into the parylene base material. Post-annealing temperatures should exceed the parylene phase transition temperature to enhance diffusion. We have demonstrated that 320 degrees Celsius for 30 minutes is effective. Also, the resistance of a thick (approximately 1 um) film of parylene C can be reduced from being perfectly insulating (infinite resistance) to 220 K-ohm with the deposition/diffusion of a 850 angstrom copper layer. This resistance scales almost linearly with thickness and is estimated to give approximately 30 K-ohms at the targeted conformal coating thickness of 0.15 um. Other metallization materials such as aluminum and carbon could also be used. Another alternative preferred embodiment for providing ESD protection is to form the disk texture at a height exceeding the conformal coating thickness by an amount so that the texture completely penetrates the coating to allow contact between the metallized disk surface and the underlying metal of the spacer rings and clamp plate.

In an alternative preferred embodiment of the present invention, texture is applied to the disk clamp surfaces, hub flange surfaces, and/or certain space ring surfaces if they are to be in contact with a conformally coated surface. Similarly, a conformally coated spacer can be assembled between the hub flange and bottom-most disk surface in the disk stack, instead of coating the hub flange with the conformally coated surface. These options assure that a textured surface and a conformally coated surface forms the interface of adjacent pairs of components in the disk stack assembly to provide the mechanical interlock and intimacy of contact between surfaces required for disk slip prevention, according to the present invention. As will be appreciated, the preferred embodiment for a given disk stack will depend upon specific system elements such as the sequence of stacking components on the spindle hub.

Figure 3A:
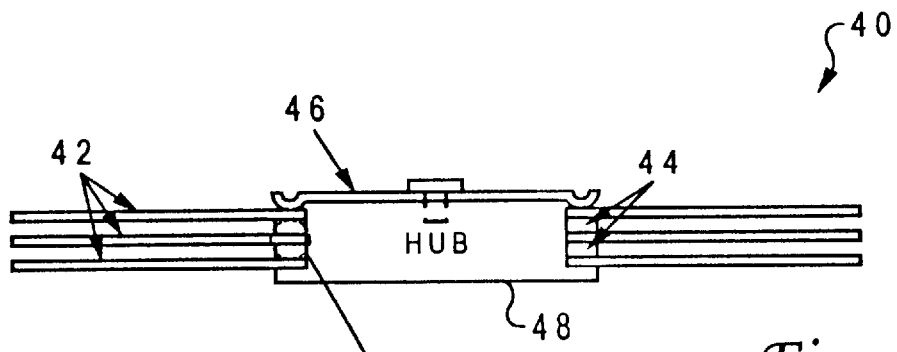
FIGS. 3A–3B show an interlocked disk stack having a plurality of disks with textured inner regions on both their top and bottom surfaces, in accordance with the preferred embodiment of the present invention.
Figure 3B:
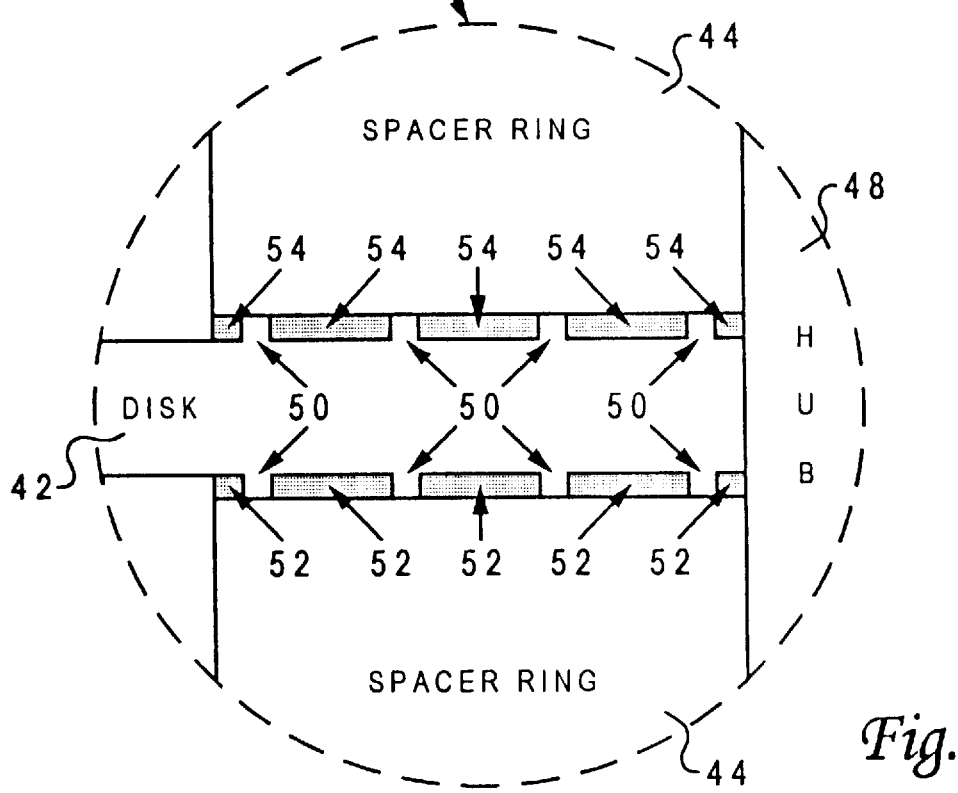

With reference now to FIGS. 3A–3B, there is shown an interlocked disk stack 40 having a plurality of disks 42 with textured inner regions on both their top and bottom surfaces. Disks 42 are stacked on hub 48 with spacer rings 44 having a conformal coating on both top and bottom surfaces placed between them to fixedly space the disks on hub 48. Disk clamp 46 has a conformable layer on its bottom surface and clamps to hub 48 to apply pressure to disks 42 and spacer rings 44 to create the mechanical interlock of the textures and conformable coatings that will maintain the disks firmly attached to hub 48.

FIG. 3B shows an enlarged sectional cut view through the center of disk stack assembly 40. As can be seen, disk 42 has texture 50 that penetrates and interlocks with conformal coatings 52, 54 formed on the surfaces of the lower and upper spacer rings 44, respectively. The conformal coatings 52, 54 conform to the texture 50 because disk clamp 46 and hub 48 forces the surfaces in tight contact. The conformal coating conforms to the texture to form a tight mechanical interlock between the surfaces of disk 42 and spacer rings 44 that will inhibit any movement of the disk, particularly any disk slip that may occur from forces applied in-plane to the disk 42.

Figure 4:
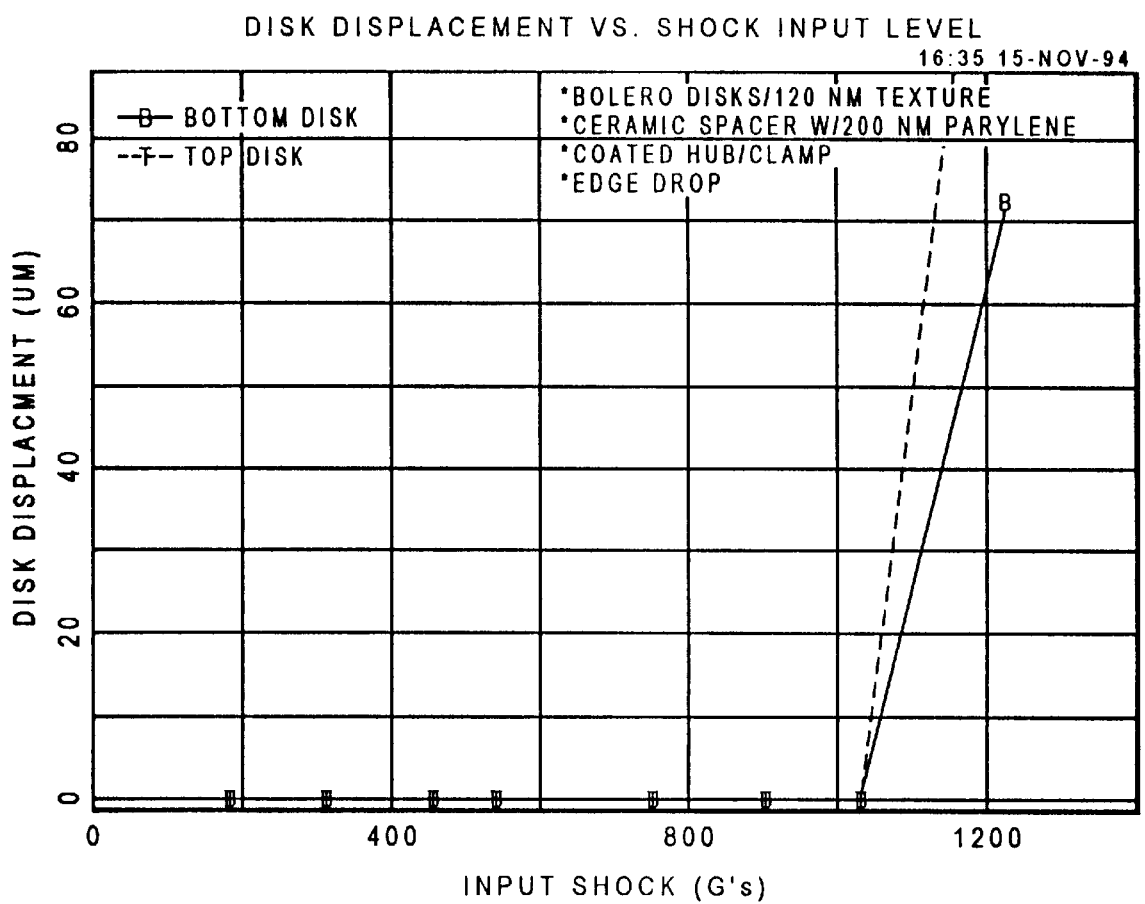
FIG. 4 shows the amount of disk displacement produced by input shocks applied to the disk stack of the present invention.
Figure 5:
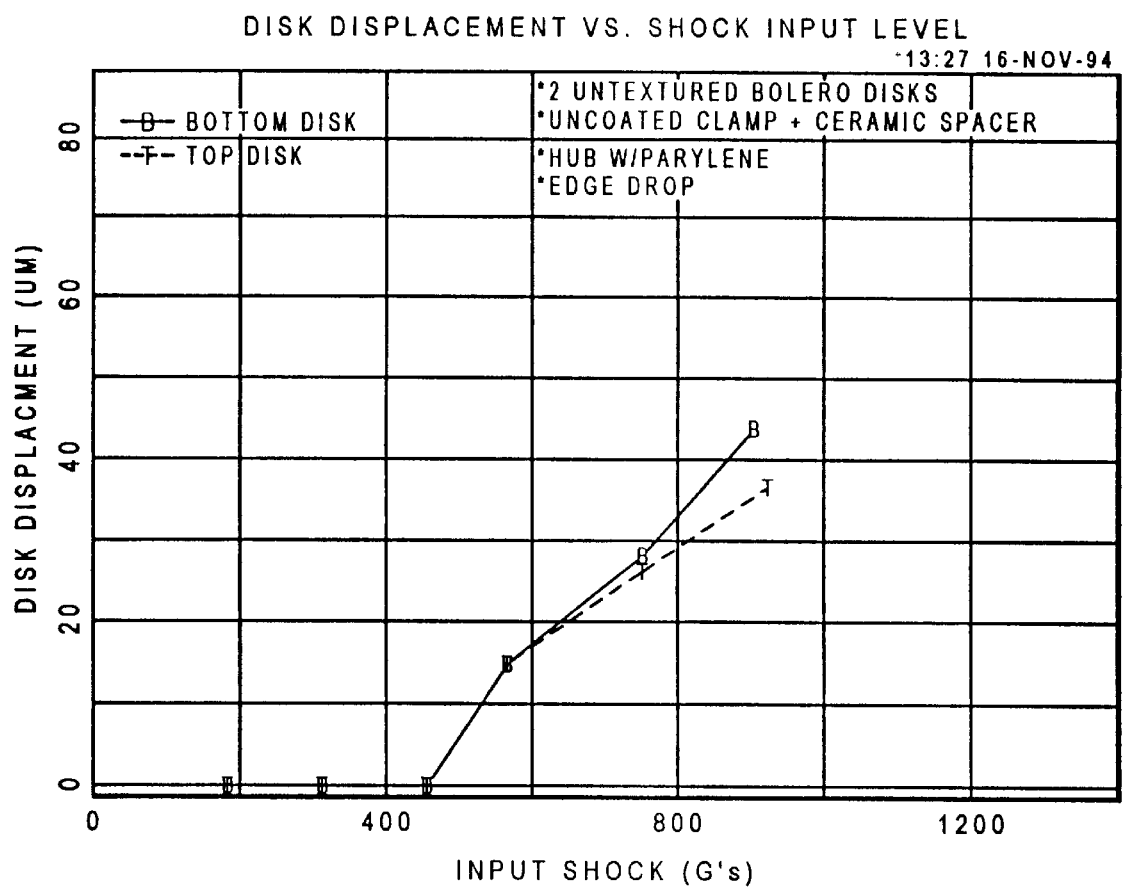
FIG. 5 shows comparative testing of a standard disk stack assembly having standard components and not incorporating the interlocking disk apparatus of the present invention.

With reference now to FIGS. 4 and 5, there is shown two graphs that exemplify the substantial improvement in disk slip provided by the present invention. FIG. 4 shows the amount of disk displacement (i.e., disk slip) produced by input shocks applied to the disk stack of the present invention. The disks in the disk stack used to generate the graph in FIG. 4 include a texturing in the inner diameter clamp zone achieved through a $CO_2$ laser heating process to produce dome-shaped bumps on the disk substrate, which were approximately 135 nanometers (nm) high and 15 micrometers (um) in diameter at their base. These were distributed in an almost rectangular array in the clamp zone with center-to-center bump spacing of approximately 35 um. The textured disk substrates were then processed through standard Bolero thin film disk processing, as will be understood by those skilled in the art. Final height of the bumps was measured to be 120 nm. In addition, parylene C conformal coatings were vapor deposited on disk spacer rings, clamp plates, and hubs. The target thickness for the conformal coatings was 150 nm, and an actual coating thickness of 200 nm was achieved. These components were assembled with the disks in a two-disk stack with a 35 Kgf clampload and then subjected to in-plane shocks. Position of the disks relative to the hub datum surface was monitored initially and after each shock to determined when slippage occurred. FIG. 5 shows comparative testing performed on a standard disk stack assembly having standard components and not incorporating the interlocking disk apparatus of the present invention. As can be seen from FIGS. 4 and 5, the interlocking disk apparatus of the present invention completely prevented disk slip for shocks applied to the disk stack exceeding a thousand Gs (1 millisecond duration), whereas the slip threshold for the standard disk stack assembly was approximately 500 Gs. In addition, tests showed that generating a texture on the disk and forming conformal coatings on disk stack hardware does not degrade the flatness of the disk, even when subjected to clamping.

Figure 6:
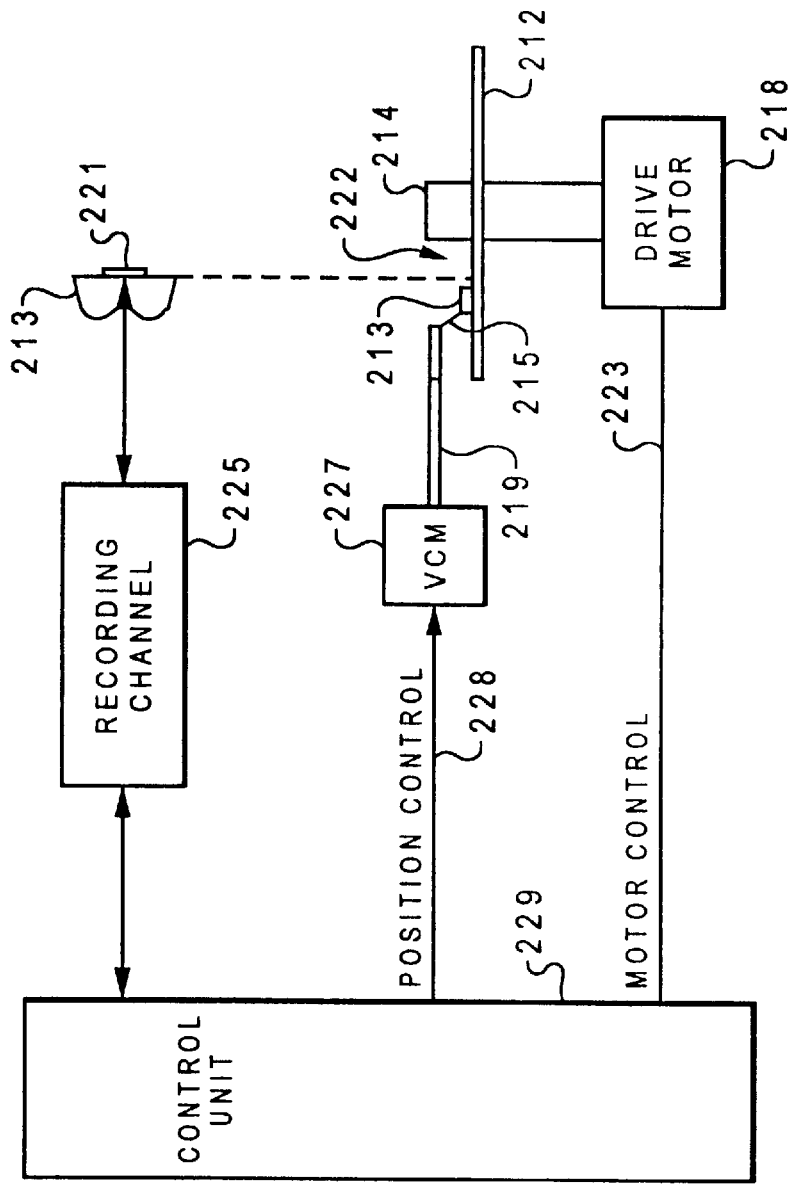
FIG. 6 depicts a block diagram of a magnetic disk storage system suitable for utilizing the interlocked disk stack of the present invention.

FIG. 6 depicts a block diagram of a magnetic disk storage system suitable for utilizing the interlocked disk stack of the present invention. The invention described in this application is useful with all mechanical configurations of magnetic storage disk drives or direct access storage devices ("DASD"). Also, it will be appreciated that the invention is also applicable to and may be utilized by other information storage systems such as an optical data storage system or a magnetic tape recording system, for example.

At least one rotatable magnetic disk 212 is supported on a spindle/hub 214 and rotated by a disk drive motor 218. The magnetic recording media on each disk is in the form of an annular pattern of concentric data tracks (not shown) on disk 212. At least one slider 213 is positioned on the disk 212, each slider 213 is supporting one or more magnetic read/write heads 221. As the disk(s) rotate, the sliders 213 are moved radially in and out so that the heads 221 may access different portions of the disk surface 222 containing the data.

Each slider 213 is attached to an actuator arm 219 by means of a suspension 215. The suspension 215 provides a slight spring force which biases the slider 213 against the disk surface 222. Each actuator arm 219 is attached to an actuator means 227. It should be apparent that disk storage systems may contain a large number of disks and actuators, and each actuator may support a number of sliders.

The various components of the disk storage system are controlled in operation by signals generated by control (read/write electronics) unit 229, such as access control signals and internal clock signals, and which includes logic control circuits, storage means and a microprocessor. The control unit 229 generates control signals to control various system operations such as motor control signals on line 223 and head position control signals on line 228. The control signals on line 228 provide the desired current profiles to optimally move and position a selected slider 213 to the desired data track on the associated disk 212. Read and write signals are communicated to and from read/write heads 221 by means of recording channel 225, which includes conductor lines running along suspension 215 and actuator arm 219.

Figure 7:
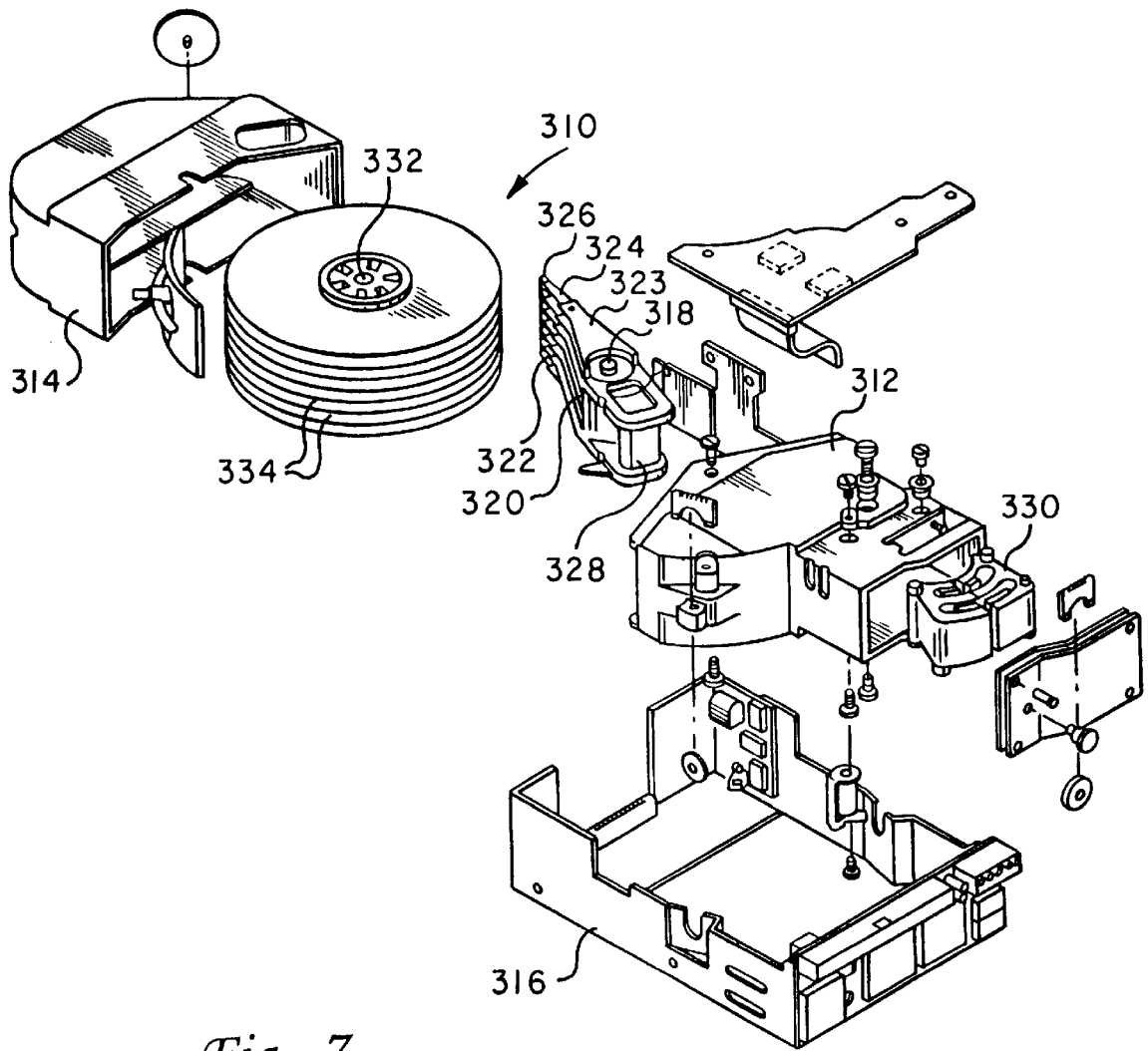
FIG. 7 depicts an exploded view of the disk drive system suitable for utilizing the interlocked disk stack of the present invention.

FIG. 7 depicts an exploded view of a disk drive suitable for utilizing the interlocked disk stack of the present invention. The disk drive 310 includes a housing 312, and a housing cover 314 which, after assembly, is mounted within a frame 316. Rotatably attached within the housing 312 on an actuator shaft 318 is an actuator arm assembly 320. One end of the actuator arm assembly 320 includes an E block or comb like structure 322 having a plurality of actuator arms 323. Attached to the separate arms 323 on the comb or E block 322 are spring suspensions 324. Attached at the end of each spring suspension is a slider 326 which carries a magnetic transducer (not shown). On the other end of the actuator arm assembly 320 opposite the spring suspensions 324 and the sliders 326 is a voice coil 328.

Attached within the housing 312 is a pair of magnets 330. The pair of magnets 330 and the voice coil 328 are key parts of a voice coil motor which applies a force to the actuator assembly 320 to rotate it about the actuator shaft 318. Also mounted within the housing 312 is a spindle shaft 332. Rotatably attached to the spindle shaft 332 are a number of disks are mounted in disk stack 334. The disks are attached to the spindle shaft 332 in spaced apart relation. As an example, in FIG. 7, eight disks are attached to the spindle shaft 332.

In summary, an interlocking disk apparatus for preventing disk slip in a disk stack of a magnetic or optical disk drive is provided. A textured region within the inner diameter of the disks in the disk stack is forced in tight contact with a conformable adjacent surface, such as a spacer ring, clamp plate, and/or hub flange. As the conformable adjacent surface conforms to the texture, an interlock between the surfaces is formed that inhibits movement of the disk in the direction of a shock applied to the disk, thereby preventing disk slip. As will be appreciated, this mechanical interlock of the disk stack components eliminates or minimizes disk slip and generally improves interfacial contact between the disk surfaces and adjacent surfaces in the disk stack assembly of the disk drive. Clamping of the disk stack forces the disk texture to penetrate into and/or through the adjacent conformally coated surfaces to provide the interlocking of disk stack components. Optimization of the disk interlock apparatus can be accomplished through control of the disk texture height, size, shape, location, and/or distribution in combination with control of the thickness, adhesion, mechanical properties, location and/or distribution of the conformal coating, as is desired and/or required for a particular configuration of the disk stack. Also, because of the substantially enhanced interlocking of components, disk distortion due to disk clamping can be minimized by reduction of disk clamp load, while improving disk slip resistance. Lastly, electrical grounding can be accomplished by diffusing conductive materials into the polymer conformal coating to increase its electrical conductivity and prevent ESD. While the invention has been particularly shown and described with reference to a preferred embodiment, it will be understood by those skilled in the art that various changes in form and detail may be made therein without departing from the spirit and scope of the invention.

What is claimed is:

1. A recording/reproducing interlocking disk apparatus, comprising:
   at least one disk having a first surface and a second surface, wherein said first surface includes an electrically conductive textured region formed therein having a non-information-bearing texture, said non-information-bearing texture being formed by a regular pattern of raised protrusions that extend outwardly a substantial distance from adjacent portions of said first surface; and
   a conformable adjacent surface having a uniform thickness less than a height of the raised protrusions so that the raised protrusions contact either a spacer ring or a spindle hub, wherein when said conformable adjacent surface is forced in tight contact with the textured region of the at least one disk, the conformable adjacent surface conforms to and is penetrated by the non-information-bearing texture to form an interlock between the conformable adjacent surface and the first surface of the disk such that, when the disk is subjected to an external force, the disk is inhibited from moving in the direction of the force by the interlocked surfaces.

2. A recording/reproducing interlocking disk apparatus according to claim 1, wherein the disk is an optical disk.

3. A recording/reproducing interlocking disk apparatus according to claim 1, wherein the disk is a magnetic disk.

4. A recording/reproducing interlocking disk apparatus according to claim 1, wherein the conformable adjacent surface is a surface on the spacer ring.

5. A recording/reproducing interlocking disk apparatus according to claim 1, wherein the conformable adjacent surface is a surface on the spindle hub.

6. A recording/reproducing interlocking disk apparatus of claim 1, wherein both of said first and second surfaces include a textured region having a non-information-bearing texture.

7. A recording/reproducing interlocking disk apparatus of claim 1, wherein said disk is an information storage disk and wherein at least one of said first surface and said second surface includes an information-bearing region.

8. A recording/reproducing interlocking disk apparatus of claim 1, wherein each of said raised protrusions is a substantially dome-shaped bump formed by laser heating.

9. A disk drive having improved disk slip, said disk drive comprising:
   an interlocked disk stack including at least one disk having a first surface and a second surface, at least one of said first and second surfaces having a plurality of tracks for recording information, wherein said first surface has an electrically conductive textured region formed therein having a non-information-bearing texture, said non-information-bearing texture being formed by a regular pattern of raised protrusions that extend outwardly a substantial distance from adjacent portions of said first surface, said interlocked disk stack further including a conformable adjacent surface forced in tight contact with the textured region of the at least one disk, said conformable adjacent surface having a uniform thickness less than a height of the raised protrusions so that the raised protrusions contact either a spacer ring or a spindle hub, wherein the conformable adjacent surface is penetrated by and conforms to the non-information-bearing texture to form an interlock between the conformable adjacent surface and the first surface of the disk such that, when the disk is subjected to an external force, the disk is inhibited from moving in the direction of the force by the interlocked surfaces;
   a means for rotating the interlocked disk stack;
   transducer/actuator means for reading and/or writing to selected tracks on the at least one disk; and
   means coupled to the transducer/actuator means for reading signals transmitted by the transducer/actuator means that are representative of information recorded on the at least one disk.

10. A disk drive having improved disk slip according to claim 9, further comprising means coupled to the transducer/actuator means for writing information to selected tracks on the at least one disk.

11. A disk drive having improved disk slip according to claim 9, wherein the disk drive is a magnetic disk drive.

12. A disk drive having improved disk slip according to claim 9, wherein the disk drive is an optical disk drive.

13. A disk drive having improved disk slip according to claim 9, wherein the conformable adjacent surface is a surface on the spacering.

14. A disk drive having improved disk slip according to claim 9, wherein the conformable adjacent surface is a surface on the spindle hub.

15. The disk drive of claim 9, wherein both of said first and second surfaces include a textured region having a non-information-bearing texture.

16. The disk drive of claim 9, wherein each of said raised protrusions is a substantially dome-shaped bump formed by laser heating.

* * * * *

UNITED STATES PATENT AND TRADEMARK OFFICE
CERTIFICATE OF CORRECTION

PATENT NO. : 5,875,171
DATED : Feb. 23, 1999
INVENTOR(S) : Albrecht et al.

It is certified that error appears in the above-identified patent and that said Letters Patent are hereby corrected as shown below:

In the TITLE, after "STORAGE DISK", please insert -- DRIVE --.

In Col. 4, line 22, please delete "post-annealing" and insert -- post-annealed --.

In Col. 8, Claim 13, line 45, please delete "spacering" and insert --spacer ring--.

Signed and Sealed this

Twenty-ninth Day of May, 2001

Attest:

NICHOLAS P. GODICI

*Attesting Officer*  *Acting Director of the United States Patent and Trademark Office*